(12) United States Patent
Goerick

(10) Patent No.: US 11,130,410 B2
(45) Date of Patent: Sep. 28, 2021

(54) CONTROLLER FOR CONTROLLING AN OUTPUT POWER OF AN ELECTRIC VEHICLE, ELECTRIC VEHICLE COMPRISING SUCH CONTROLLER AND CORRESPONDING METHOD

(71) Applicant: HONDA RESEARCH INSTITUTE EUROPE GMBH, Offenbach/Main (DE)

(72) Inventor: Christian Goerick, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 92 days.

(21) Appl. No.: 16/209,096

(22) Filed: Dec. 4, 2018

(65) Prior Publication Data

US 2019/0176649 A1    Jun. 13, 2019

(30) Foreign Application Priority Data

Dec. 7, 2017    (EP) ..................................... 17205824

(51) Int. Cl.
*B60L 15/20* (2006.01)
*B60L 58/10* (2019.01)

(52) U.S. Cl.
CPC ......... *B60L 15/2045* (2013.01); *B60L 15/209* (2013.01); *B60L 15/2054* (2013.01); *B60L 58/10* (2019.02); *B60L 2200/12* (2013.01); *B60L 2240/80* (2013.01); *B60L 2260/167* (2013.01); *B60L 2260/26* (2013.01)

(58) Field of Classification Search
CPC .. B60L 15/2045; B60L 58/10; B60L 15/2054; B60L 15/209

USPC ........................................................ 701/22
See application file for complete search history.

(56) References Cited

U.S. PATENT DOCUMENTS

| | | | |
|---|---|---|---|
| 8,093,843 B2 * | 1/2012 | Okamura | B60L 15/2045 318/139 |
| 2011/0295454 A1* | 12/2011 | Meyers | B60L 15/2036 701/22 |
| 2012/0124397 A1* | 5/2012 | Brooks | G06F 1/32 713/300 |

(Continued)

FOREIGN PATENT DOCUMENTS

JP    2003208831 A  *  7/2003

OTHER PUBLICATIONS

European Search Report dated Jun. 29, 2018 corresponding to European Patent Application No. 17205824.0.

*Primary Examiner* — Isaac G Smith
(74) *Attorney, Agent, or Firm* — Squire Patton Boggs (US) LLP

(57) ABSTRACT

The invention regards a controller for controlling an output power of an electric vehicle, such vehicle and a respective method. The controller is configured to operate in a drive mode controlling electrical energy to a motor generating torque for driving the vehicle based on a throttle input signal. The controller is further configured to receive, in addition to the throttle input signal, a further user controllable signal and to switch the controller in response to such user controllable signal to a maximum power mode for a time interval, wherein in the maximum power mode the maximum electrical energy that can be delivered to the motor is increased compared to the drive mode.

14 Claims, 3 Drawing Sheets

(56) References Cited

U.S. PATENT DOCUMENTS

2014/0111121 A1* 4/2014 Wu .................... B60L 15/2009
 318/139
2015/0149006 A1* 5/2015 Han ....................... B60L 50/51
 701/22
2016/0075257 A1 3/2016 Wein et al.

* cited by examiner

CONTROLLER FOR CONTROLLING AN OUTPUT POWER OF AN ELECTRIC VEHICLE, ELECTRIC VEHICLE COMPRISING SUCH CONTROLLER AND CORRESPONDING METHOD

BACKGROUND

Field

The invention regards a controller for controlling an output power of an electric vehicle, electric vehicle, in particular an electric off-road motorcycle, comprising such controller and corresponding method.

Description of the Related Art

For more than 120 years vehicles have been developed that use internal combustion engines to propel vehicles that transport people individually. For public transportation it is also common to use electric energy, like for example for trains, subways or inner city busses. But for such public transportation systems it is relatively easy to provide the vehicle with electric energy. The vehicles follow predetermined lines and therefor a cable system can be built that is contacted by the vehicle. Consequently, it is not necessary that the vehicle is equipped with an energy storage unit. On the other side the use of internal combustion engines has the advantage that a fuel tank is quickly refilled and fuel is available at many well distributed places. So the risk to run out of energy is rather low.

However, the resources for fuel are shrinking and pollution is also problematic, even if efficient exhaust cleaning systems have been developed. Electrically driven vehicles are considered to alleviate these problems. Especially in areas where noise should also be avoided, vehicles equipped with an electric drive train promise an improvement. Unfortunately, contrary to public transportation systems, no energy supply by a cable system is possible and therefor the vehicle must carry its own electric energy storage with it. Since furthermore recharging batteries of the electric vehicle is time consuming and suitable chargers are not yet available at many places, strategies have been developed to avoid that a user of such electric vehicle is surprised by an empty battery.

One approach is to find a compromise between an upper limit of output power torque produced by the motor when the user fully opens the throttle and other aspects of driving like controllability or conditions under which the vehicle is driven. Such conditions may for example be the remaining driving distance depending on the state of charge (SOC) of the battery, a current battery temperature and/or wear level of the battery or other constraints like heat management or the like. The conditions and constraints under which the vehicle is operated may vary. To take account of such variation the controller controlling the output of power or torque in response to a demand indicated by a throttle signal calculates an energy amount supplied to the motor of the vehicle according to a drive mode in which the controller is operated. The drive mode defines an algorithm that defines a power output depending from input parameters. Usually a controller may use one of a plurality of such drive modes that are either set according to a user input or set automatically, which is advantageous when critical system parameters are measured, for example an excessive high temperature of one of the system components or a low SOC.

In most driving situations such approach seems to be reasonable. But there might occur some specific situations where the limitation of the output power, and thus the available torque, leads to critical driving. Especially for vehicles that are not used for street driving only but also off-road in difficult terrain, this limitation of torque may cause problems. Considering an off-road motorcycle as an example making a U-turn on gravel. Here a high torque is necessary while the vehicle is very slow in order to keep the wheel slipping. On the other side high rpm (rotations per minute) and simultaneously high torque is necessary when the vehicle is negotiating very deep terrain like lose sand or deep mud at low speed. The driving modes are usually not suitable for such situations. The conditions in these unusual situations deviate from any other situation experienced during every day driving and a drive mode taking account of the exceptional cases as well would lead to an uncontrollable or at least difficult controllable vehicle. Such situations are even difficult for an off-road motorcycle with an internal combustion engine. But here it is the rider who handles the situation manually by using the clutch and throttle. Electric vehicles do not need a clutch and consequently do not have one.

Another requirement one might think of when considering the limitations of conventional drive modes is climbing a steep slope. Here a high power output is necessary, but only for a short period of time. Conventional drive modes that take into consideration the remaining distance never can provide such high power output. But in a worst case scenario this might cause that he driver is not able to climb the slope and has to drive a significantly longer distance thereby jeopardizing the intention of optimizing the remaining distance by limiting the output power maximum.

Further, there exist approaches to improve the maximal output power by providing a second energy storage in addition to a main battery as disclosed in US2014/0111121 A1. But here the intention is to lower the requirements for the main battery but still being able to provide sufficient output power. The additional power is controlled by the drive mode which is not changed. Only a higher output of the combined battery is used to provide additional output every time an increased load is determined. But this additional availability is entirely independent from a driver's operation.

SUMMARY

There is consequently a need to create an electric vehicle that offers an improved controllability in difficult driving situations while not jeopardizing its normal use and driveability.

This object is achieved by the electric vehicle comprising the inventive controller and implementing the method according to the independent claims. The dependent claims define advantageous aspects and embodiments of the invention.

The controller according to the invention is used to control an output power of a motor that propels the vehicle by controlling the amount of energy that is supplied to the motor. The controller generally determines this energy amount or the power to be output by the motor based on a throttle signal which is received from a throttle operated by a user. With such throttle, in case of a motorcycle usually a rotatable handle grip, the driver or rider indicates his output power wish. The controller is operated in a driving mode that essentially consists of an algorithm that includes the rules for determining the output power or energy to be provided taking into consideration at least the throttle signal, but preferably also other system parameters, like SOC of the battery, temperature and so on as listed above already.

According to the invention it is now possible that the user overrules this algorithm. To achieve such overruling, the controller is configured to receive an additional signal which is also controllable by a user. In response to such signal the controller will unlock the entire available output power which consequently is only dependent from the throttle signal. Doing so the user has full control of the output power and may well use more power than the drive mode would have permitted. This overruling means that for a time interval the controller does not determine the output power based on the set drive mode but switches to a maximum power mode. Maximum power mode means that all the power that is theoretically available in the current condition of the drive system can be demanded by the user. Contrary to the regular set drive mode no compromise is made with respect to temperature, SOC or the like. For the time interval an increase in electric energy supplied to the motor is therefor available. Such a controller is included in a vehicle according to the invention and it carries out the method steps as mentioned above. At the end of the time interval the controller automatically switches back to the drive mode that was left when the maximum power mode was switched.

The inventive approach has the advantage that in exceptional situations the user can decide by himself without being limited by a system's decision how much power is output. Critical situations can be avoided, because there is no bad surprise of less power than expected and the desired riding manoeuvre can easily be performed. Further, because the controller automatically switches back to the initial drive mode, only a minimum of user operation is necessary.

According to a preferred embodiment the duration of the time interval is directly controlled by the duration of the user input that generates the further signal. The additional power is then available exactly as long as the user indicates.

On the other side, and according to a further advantageous embodiment, the maximum length of the time interval can be predetermined. The switching back to the original drive mode will then occur when a maximum duration from start of the operation is reached. In case that the user forgets about to release of the signal it is then ensured that the usual drive mode is nevertheless used again. The maximum duration is advantageously set so that most of the exceptional driving situations are well covered.

According to another advantageous embodiment, the drive mode is one of a plurality of available drive modes which can be set by a user or that are set automatically based on measurable system parameters of the electric vehicle and the maximum energy that may be delivered to the motor is set in accordance with the currently used drive mode. The maximum power available may thus depend if the initial drive mode already is a drive mode with limited power output, for example when a low SOC is recognized, or a regular drive mode which limits the power only due to high temperatures or the like.

In particular, when the electric vehicle is a motorcycle, even more if an off-road motorcycle is considered, the power switch which is operated by the user is a pushbutton, advantageously mounted on a handle bar of the motorcycle. Further advantageously, the pushbutton is arranged in a recess so that unintended operation is avoided. If the switch short circuits a pin of the controller only one wire is necessary and slightly adapted engine stop switches as commonly used for dirt bikes can be used.

Alternatively, the switch can be realized in the form of a clutch lever. Then, the rider who is used to use a clutch in some of the situations may in a similar way operate the clutch lever like switch and again unintentional operation of such power switch is avoided. Further, using a clutch lever design for the switch allows that the thumb still holds the handlebar which improves control over the motorcycle.

BRIEF DESCRIPTION OF THE DRAWINGS

Further aspects, features and advantageous will become apparent from the following description of a preferred embodiment which is illustrated in the annexed drawing. In the drawing

DETAILED DESCRIPTION

It is to be noted that the invention is particularly useful for controlling the available output power of an off-road motorcycle. In the following, although other vehicles may use the invention as well, a motorcycle will be used for explanation and its operator or user is designated as rider.

Figure 1:
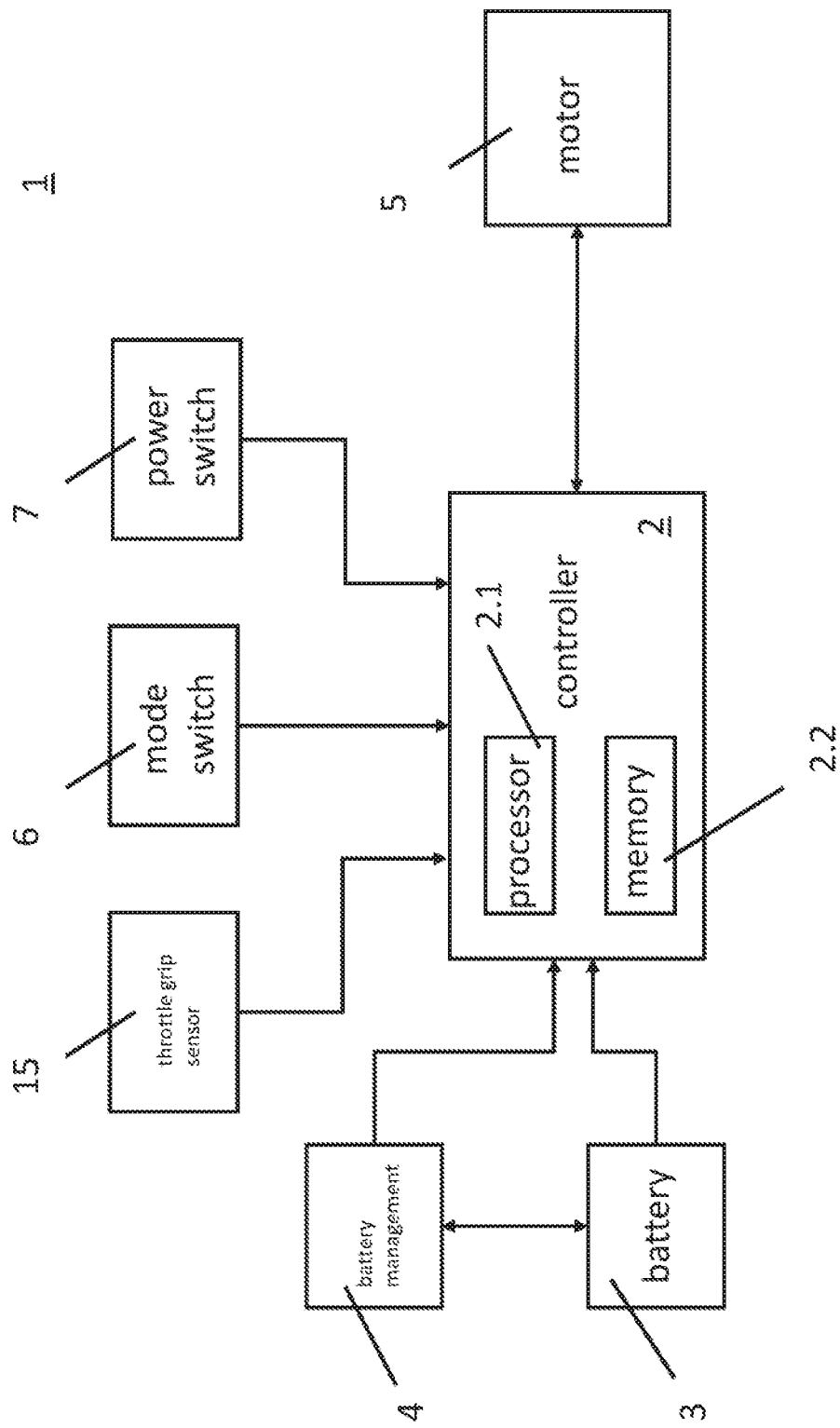
FIG. 1 shows a schematic of the main components of a motorcycle as an example for an electric vehicle according to the invention.

FIG. 1 is a schematic that shows the main components of an electric drive system 1 of an electric motorcycle. The central unit is a controller 2 which receives information on the system from various sensors and which is connected to a rechargeable battery 3. The rechargeable battery 3 stores electric energy and is charged by means of a charger, not shown in FIG. 1.

The controller 2 receives information on the status of the rechargeable battery 3 via a battery management system 4. This information includes, but is not limited to, temperature of the rechargeable battery 3 and state of charge (SOC). Using this information, the controller 2 can determine how much electric energy (per time unit) can reasonably be taken out of the rechargeable battery 3 to provide a motor 5 (electrical engine) with electric power and without badly affecting the temperature of the system or the like. In a known manner the controller 2 determines an upper limit for the current taken out of the rechargeable battery 3. Up to this upper limit the current taken out of the battery 3 and being supplied to the motor 5 can be set freely. The controller 2 sets the actual amount based on a demand that is indicated by the rider of the motorcycle.

To indicate such demand, the rider operates in a well-known manner which does not distinguish from a motorcycle having an internal combustion engine a throttle grip. In an electric motorcycle the throttle grip includes a sensor 15 that determines an angle about which the grip has been rotated and generates a signal being fed to the controller 2 as a throttle input signal. The throttle input signal is used in the controller 2 to determine a torque request from the rider.

The controller comprises a processor 2.1 which processes the received information to determine an output torque of the motor which is equivalent to a current for the motor 5. This determination is performed by executing a program stored in a non-volatile memory 2.2 of the controller 2. In the simplest form of an electric motorcycle memory 2.2 holds only one program which is loaded into the processor 2.1 upon power up of the system and executes this program using a fixed parameter set.

In FIG. 1 there is shown a mode switch 6. The mode switch 6 is operated by the rider of the motorcycle in order to select one out of a plurality of drive modes. Different drive modes may be for example optimized for long distance travelling, track, road, rain and so on. It is preferred that these different drive modes all use the same program but with different parameter sets which are stored in the memory 2.2 and which are set in the program after the respective mode has been selected by the rider. The parameter sets are optimized for different compromises between remaining distance and power output.

The process of selecting one of a plurality of drive modes is known in the art as well as the different modes themselves and the components as described above fulfil their well-known tasks for operating the electric motorcycle. According to the invention there is now an additional possibility for the rider to influence the way the controller 2 determines the power output in response to the throttle input signal. While the controller 2 controls the motor 5 using the selected drive mode in which typically the upper limit current is less than a maximum current that could be delivered by the rechargeable battery 3, the user can operate a power switch 7 independently from the operation of the throttle grip. The signal being output by the power switch 7 is preferably an "on/off"-type signal. The duration of the signal is controlled by the rider. The controller 2 is connected to the power switch 7 and thus receives an "on"-signal when the rider operates the power switch 7.

When the controller 2 receives such power "on"-signal it ignores all the limiting factors that are taken in account when the operation is performed according to the selected drive mode. The controller 2 rather determines the maximum power available using the maximum possible current from the rechargeable battery 3. Thus, independently from the effect such power output from the motor 5 on the remaining distance, temperature of the system 1 and the like, the maximum possible output power is unlocked.

The controller 2 is configured to adjust the current supplied to the engine in response to a fully opened throttle to this maximum current and as a result the maximum possible power or torque is output by the motor 5. Of course, if the power switch 7 is operated but the throttle is not fully open only a portion of the maximum available output power needs to be output and the controller 2 will set the current accordingly.

By operating the power switch 7 the rider can overrule the drive mode by such maximum power mode. After the rider releases the power switch 7 the controller 2 switches back to its initially executed drive mode. The start of the operation and releasing the power switch 7 define a duration during which the controller is in the maximum power mode, provided that this duration is not longer than a predetermined maximum duration. The controller 2 remembers the initial drive mode that was left and turns back to it.

In order to ensure that the controller 2 cannot get stuck in the maximum power mode, which could happen for example when the power switch 7 does not return into its idle position, for example because of dirt, the maximum duration for a time interval in which the controller 2 is operated in the maximum power mode is limited. Generally the time interval is defined by the operation duration of the power switch 7. When the time interval exceeds this limit the controller 2 will also return into the initial drive mode.

Figure 2A:
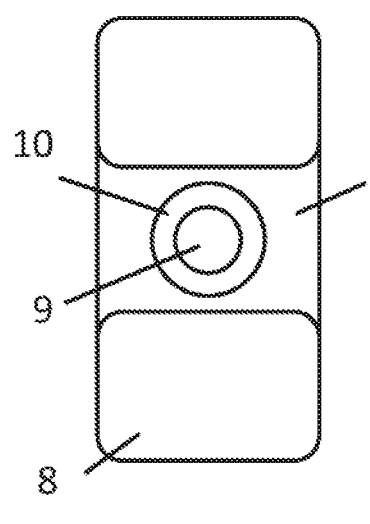
FIGS. 2*a*, 2*b* two different views of an example for a power switch to be operated to unlock maximum power.

The power switch 7 according to a simple embodiment connects one pin of the controller 2 with ground when the power switch 7 is operated. This pulls down a potential in the controller 2 which can be detected by the controller 2. One preferred embodiment of a power switch 7 that can easily be mounted on a handlebar of a motorcycle is shown in FIGS. 2a and 2b.

The power switch 7 comprises a housing 8 through which a pushbutton 9 protrudes. The pushbutton 9 is sealed with a sealing 10 against dirt and water. The pushbutton 9 is arranged in a recessed portion 11 of the housing 8 so that accidental operation of the pushbutton 9 is avoided. The recess 11 and its function can easily be understood looking at FIG. 2b. It is evident that the pushbutton 9 protrudes from the housing 8 of the power switch 7 only to such an extent that its user oriented surface of the housing 8 is approximately flat with the housing 8 in the not recessed area.

Figure 2B:
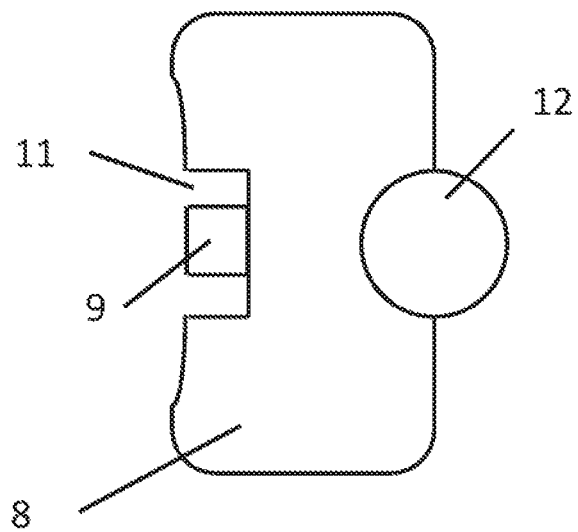

FIG. 2b further shows that the power switch 7 being designed as a pushbutton 9 is mounted on a handlebar 12 which is indicated in cross section. The pushbutton 9 is biased by a spring to return into its idle position. Similar switches are known for motorcycles to interrupt the ignition but with a flat housing and projecting pushbutton so that the pushbutton may be reached easily under all circumstances and accidental operation might occur.

According to another embodiment the power switch 7 could be designed like a clutch lever. Then, instead of the regular clutch lever which in not necessary for electric motorcycles, such power switch 7 could be mounted. Since many of the regular clutch levers have a sensor for sensing whether the clutch is operated or not, such clutch lever could directly be used as a power switch 7 when the clutch sensor is connected to the controller 2.

Figure 3:
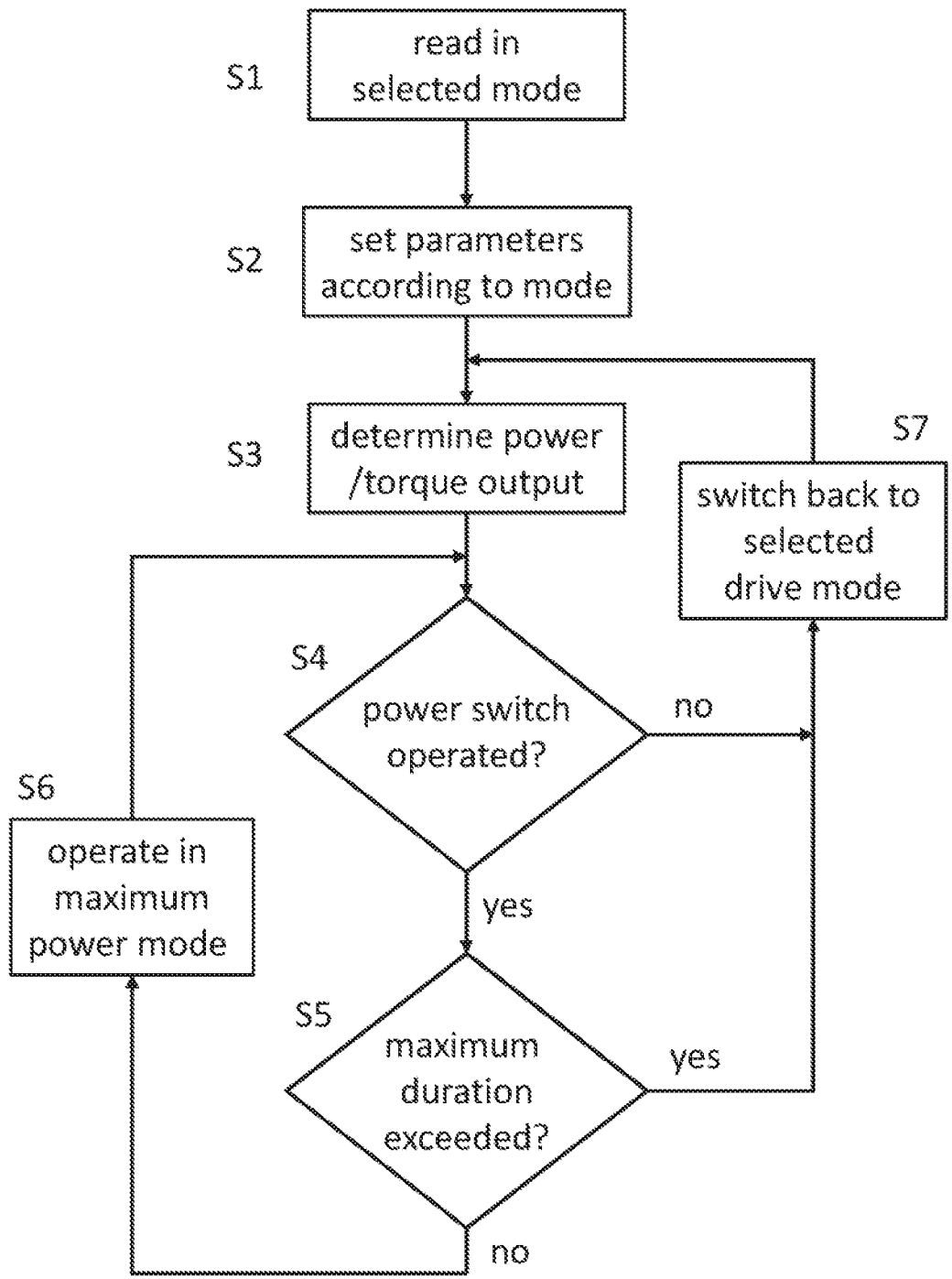
FIG. 3 a flowchart illustrating the method for controlling an output power of a vehicle.

The method steps which have been described in greater detail already above shall now be summarized with respect to the flowchart of FIG. 3.

At first in step S1 and for starting a regular operation of the motorcycle the selected drive mode is read in from a mode switch 6 which can be any kind of user interface. The parameters for operating the vehicle in this selected drive mode are retrieved from memory 2.2 in step S2. The processor 2.1 then operates the vehicle or rather the drive system 1 of the vehicle in the selected drive mode in which the power output/torque, or equivalently the electric energy that is necessary to be supplied to the motor 5 to realize the desired output power, is determined (step S3)

While the controller 2 operates the vehicle in the selected drive mode, operation of the power switch 7 is monitored in step S4. If it is recognized that the power switch 7 is operated, it is further determined whether the time interval from the beginning of the operation already exceeds a maximum duration (step S5). The controller 2 is switched to the maximum power drive mode if not and if currently the controller 2 is operating in the selected drive mode in step S6. The output power is then determined according to the maximum power mode. The process then returns to step S4 to observe if the power switch 7 is still operated and if the maximum duration is not exceeded. Of course, if the controller 2 is already in the maximum power mode, step 6 can be ignored then and the maximum power mode is maintained.

If on the other hand in step S4 it is determined that the power switch 7 is not operated any more, or, in case the drive mode is still on, has not been operated at all, the controller 2 is switched back into the selected drive mode or maintained in the selected drive mode in S7. Then, the output is determined again according to the selected drive mode.

The invention is not limited to the example of an electric motorcycle but can be applied to other electric vehicles as well.

The invention claimed is:

1. A controller for controlling an output power of an electric vehicle powered by a battery, the controller being configured to:
   receive information on at least one of a remaining driving distance, a state of charge of the battery, a temperature of the battery and a wear level of the battery,
   determine, for a drive mode, based on the received information, an upper limit of output power produced by a motor when a user fully opens a throttle,
   operate in the drive mode controlling electrical energy to the motor generating torque for driving the vehicle based on a throttle input signal and the upper limit,
   receive, in addition to the throttle input signal, a further user controllable signal, and
   switch in response to such user controllable signal to a maximum power mode for a time interval,
   wherein in the maximum power mode, the upper limit is ignored so that the maximum electrical energy that can be delivered to the motor is increased compared to the drive mode regardless of the remaining driving distance, the state of charge of the battery, the temperature of the battery or the wear level of the battery.

2. The controller for an electric vehicle according to claim 1, wherein the time interval corresponds to a duration of the user controllable signal received by the controller.

3. The controller for an electric vehicle according to claim 2, wherein a predetermined maximum is set for the time interval.

4. The controller for an electric vehicle according to claim 1, wherein the drive mode is one of a plurality of available drive modes which can be set by the user or that are set automatically based on measurable system parameters of the electric vehicle and the maximum energy that may be delivered to the motor is set in accordance with the currently used drive mode.

5. An electric vehicle powered by a battery, comprising:
   the battery,
   a motor for generating drive torque,
   a throttle generating a throttle signal in response to a user's operation,
   a controller for controlling an output power of the motor, and
   a power switch producing a maximum power signal based on an operation of the user,
   wherein the controller is configured to receive information on at least one of a remaining driving distance, a state of charge of the battery, a temperature of the battery and a wear level of the battery, to determine, for a drive mode, based on the received information, an upper limit of the output produced by the motor when the user fully opens the throttle, to operate in the drive mode controlling electrical energy to the motor for driving the electric vehicle based on a throttle input signal and the upper limit, to receive in addition to the throttle input signal, the maximum power signal, and to switch in response to the maximum power signal to a maximum power mode for a time interval,
   wherein in the maximum power mode, the upper limit is ignored so that the maximum electrical energy that can be delivered to the motor is increased compared to the drive mode regardless of the remaining driving distance, the state of charge of the battery, the temperature of the battery or the wear level of the battery.

6. The electric vehicle according to claim 5, wherein the electric vehicle is an off-road motorcycle.

7. The electric vehicle according to claim 5, wherein the power switch comprises a pushbutton.

8. The electric vehicle according to claim 7, wherein the pushbutton is positioned in a recess of the power switch housing.

9. The electric vehicle according to claim 6, wherein the power switch is a clutch-like lever of the off-road motorcycle configured to be used directly as the power switch to produce the maximum power signal.

10. The electric vehicle according to claim 5, wherein in response to an operation of the power switch an input pin of the controller is short circuited.

11. A method for controlling an output power of an electric vehicle powered by a battery, comprising the steps of:
   receiving information on at least one of a remaining driving distance, a state of charge of the battery, a temperature of the battery and a wear level of the battery,
   determining, for a drive mode, based on the received information, an upper limit of output power produced by a motor when a user fully opens the throttle,
   operating the electrical vehicle in a drive mode by a processor controlling electrical energy to the motor generating torque for driving the vehicle based on a throttle input signal and the upper limit,
   receiving, in addition to the throttle input signal, a further user controllable signal, and
   switching in response to such user controllable signal to a maximum power mode for a time interval, wherein
   in the maximum power mode, the upper limit is ignored so that the maximum electrical energy that can be delivered to the motor is increased compared to the drive mode regardless of the remaining driving distance, the state of charge of the battery, the temperature of the battery or the level of the battery.

12. The method according to claim 11, wherein the time interval in which the controller operates in the maximum power mode corresponds to a duration of the user controllable signal received by the controller.

13. The method according to claim 12, wherein the controller switches back to the drive mode when the duration of the further signal exceeds a predetermined maximum.

14. The method according to claim 11, wherein the drive mode is one of a plurality of available drive modes which can be set by the user or that are set automatically based on measurable system parameters of the electric vehicle and the maximum energy that may be delivered to the motor is set in accordance with the currently used drive mode.

* * * * *